C. SMITH.
Seed Planter.
No. 29,412. Patented July 31. 1860.
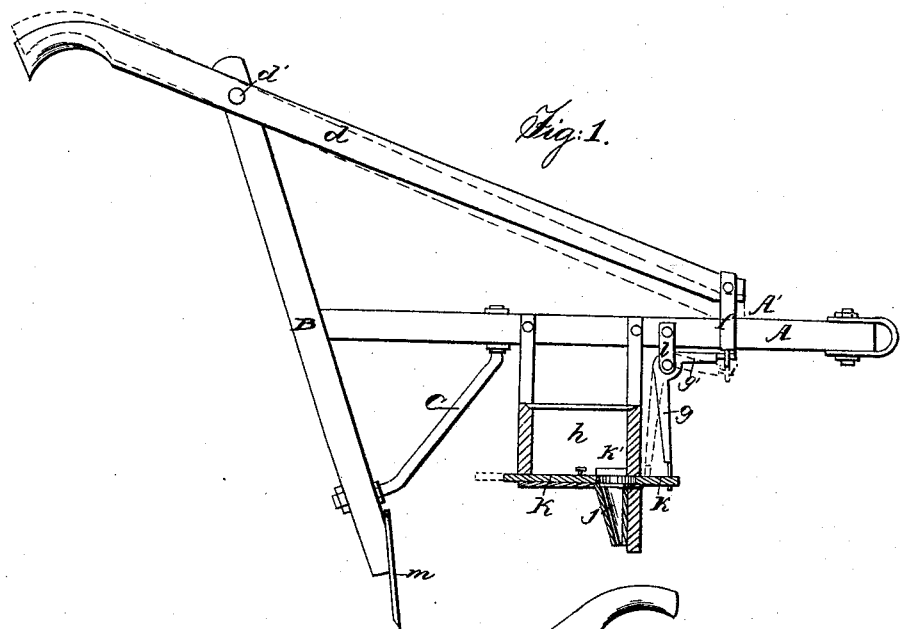
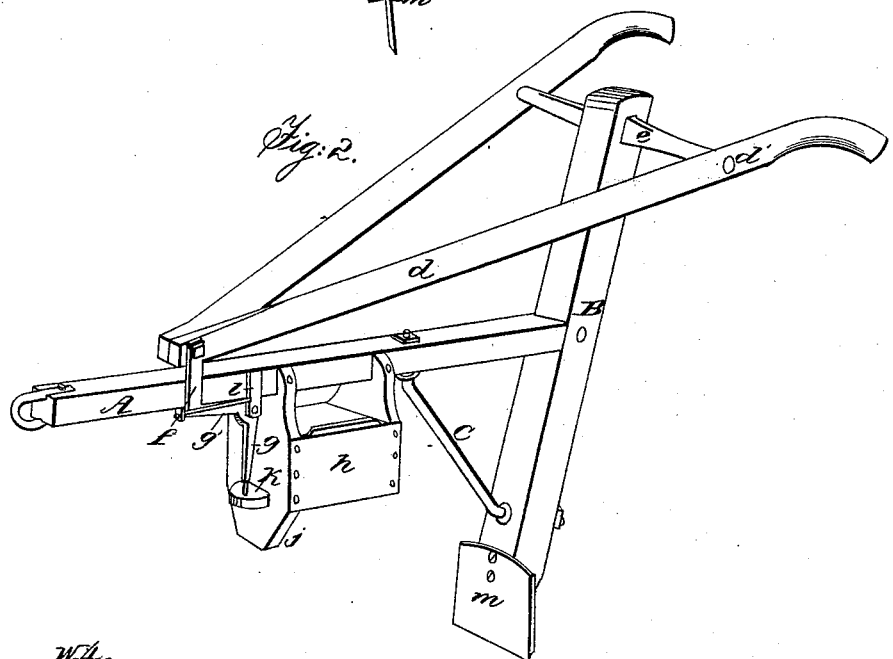
Witnesses:
Inventor:
Christopher Smith

UNITED STATES PATENT OFFICE.

CHRISTOPHER SMITH, OF NAUVOO, ILLINOIS.

IMPROVEMENT IN CORN-PLANTERS.

Specification forming part of Letters Patent No. 29,412, dated July 31, 1860.

*To all whom it may concern:*

Be it known that I, CHRISTOPHER SMITH, of Nauvoo, in the county of Hancock and State of Illinois, have invented a new and useful Improvement in Corn-Planters; and I do hereby declare that the following is a full and clear description thereof, reference being had to the accompanying drawings, and to the letters of reference marked thereon and made to form a part of this specification.

My invention relates to certain improvements in corn-planters, by means of which I am enabled to construct a planter at a trifling cost capable of planting one or two rows at the same time, as hereinafter set forth and represented.

In reference to the accompanying drawings, Figure 1 is a perspective view of a single-row planter constructed in accordance with my invention with all its parts arranged for operation. Fig. 2 is a vertical sectional view of the same.

A represents the draft beam.

B is a post, to which the shovel or hoe is attached, and is permanently secured to the beam B by means of the brace C.

d are handles, by means of which the planter is operated. Their rear ends are elevated, so as to be convenient to the operator, and their forward ends depressed and united near the beam at A'. The handles d are secured at d' by means of the bar e passing through them, the said bar e also passing through the post B.

f is a clevis clasping the beam A, and being secured to the forward ends of the handles d, as represented, and is so formed and arranged as to allow some degree of vertical motion to the forward ends of said handles, and at its lower end, under the beam A, is provided with a projection, i, in which is made a perforation for the reception of the end g' of the bent lever g.

h is a seed-hopper, permanently secured to the beam A, and provided with a slide-cover and delivery-spout j.

k is a sliding feed-bar, by means of which the corn may be deposited.

g is a bent lever, pivoted to straps l of the beam A, and extending from the pivoted point downward to the bar k, into which it is inserted, so that as the handles are elevated or depressed the bar k will be operated through the medium of the lever g and clevis f.

m is a shovel or hoe, which is adapted to cover the corn.

Having described the construction of my invention, its operation may be set forth as follows: The corn being placed in the hopper h, and the planter being made to move forward, the operator will depress the rear ends of the handles d, by means of which their forward ends will be elevated in such manner as to operate the lever g, thereby moving the bar k forward, so as to bring its aperture k' over the spout j, and allowing the corn contained in the said aperture k' to fall to the ground. As the operator elevates the handles in order to raise the hoe m from the ground, the forward ends of the handles will be depressed, by means of which the bar k will be made to return for another supply of corn. The planter still continuing to move forward, the operator will again depress the handles and bring the hoe m to the ground at a proper point to cover the corn first deposited, and at the same time another hill of corn will be dropped, as before described, and in this way the planting and covering may be continued; and by using two planters in place of one two rows of corn may be planted at the same time.

Having described the construction and operation of my invention, what I claim as new, and desire to secure by Letters Patent, is—

Operating the feed-bar k by means of the handles d, clevis f, and bent lever g, all being constructed and arranged substantially as described, for the purposes set forth.

In testimony of which invention I have hereunto set my hand.

CHRISTOPHER SMITH.

Witnesses:
J. B. ZEBRING,
JOHN BAUER.